US011671422B1

(12) United States Patent
Salehpour et al.

(10) Patent No.: US 11,671,422 B1
(45) Date of Patent: Jun. 6, 2023

(54) SYSTEMS AND METHODS FOR SECURING AUTHENTICATION PROCEDURES

(71) Applicant: NORTONLIFELOCK INC., Tempe, AZ (US)

(72) Inventors: Jonathon Salehpour, Upland, CA (US); Somard Kruayatidee, Los Angeles, CA (US)

(73) Assignee: GEN DIGITAL INC., Tempe, AZ (US)

( * ) Notice: Subject to any disclaimer, the term of this patent is extended or adjusted under 35 U.S.C. 154(b) by 43 days.

(21) Appl. No.: 17/357,910

(22) Filed: Jun. 24, 2021

(51) Int. Cl.
*H04L 29/06* (2006.01)
*H04L 9/40* (2022.01)

(52) U.S. Cl.
CPC ...... *H04L 63/0846* (2013.01); *H04L 63/0853* (2013.01)

(58) Field of Classification Search
CPC . H04L 63/0846; H04L 63/0853; H04L 63/18; H04L 67/14; H04W 12/06
See application file for complete search history.

(56) References Cited

U.S. PATENT DOCUMENTS

| | | | | |
|---|---|---|---|---|
| 8,973,109 | B2* | 3/2015 | Jillings | H04L 63/12 726/5 |
| 9,923,879 | B1* | 3/2018 | Ziraknejad | H04L 63/107 |
| 11,081,219 | B1* | 8/2021 | Dods | G06F 21/645 |
| 11,288,530 | B1* | 3/2022 | Genner | G06F 21/32 |
| 2007/0107050 | A1* | 5/2007 | Selvarajan | G06F 21/31 713/182 |
| 2009/0132813 | A1* | 5/2009 | Schibuk | G06Q 20/4014 726/9 |
| 2010/0332832 | A1* | 12/2010 | Wu | H04L 9/3271 713/169 |
| 2014/0020073 | A1* | 1/2014 | Ronda | H04L 63/0853 726/7 |
| 2017/0006439 | A1* | 1/2017 | Prabhune | H04W 4/12 |
| 2017/0041309 | A1* | 2/2017 | Ekambaram | G06F 21/44 |

(Continued)

OTHER PUBLICATIONS

E. G. Abdallah, M. Zulkernine, Y. X. Gu and C. Liem, "TRUST-CAP: A Trust Model for Cloud-Based Applications," 2017 IEEE 41st Annual Computer Software and Applications Conference (COMPSAC), Turin, Italy, 2017, pp. 584-589, doi: 10.1109/COMPSAC.2017.256. (Year: 2017).*

*Primary Examiner* — Khalid M Almaghayreh
(74) *Attorney, Agent, or Firm* — Greenberg Traurig, LLP

(57) ABSTRACT

The disclosed computer-implemented method for securing authentication procedures includes (i) monitoring, by a third-party security application, to detect reception of a second factor authentication token as an input to complete a second factor authentication procedure in connection with a second application that is independent from the third-party security application, (ii) verifying, by the third-party security application, whether or not the second factor authentication token was transmitted by a valid server in coordination with the second application as part of an authentic version of the second factor authentication procedure, and (iii) performing a security action to protect a user account based on a result of verifying whether or not the second factor authentication token was transmitted by the valid server in coordination with the second application as part of the authentic version of the second factor authentication procedure.

20 Claims, 6 Drawing Sheets

(56) References Cited

U.S. PATENT DOCUMENTS

| | | | |
|---|---|---|---|
| 2017/0230834 A1* | 8/2017 | Li | H04W 4/14 |
| 2018/0270180 A1* | 9/2018 | Chen | H04L 51/224 |
| 2019/0065724 A1* | 2/2019 | Dudley | G06F 21/35 |
| 2019/0104121 A1* | 4/2019 | Khandani | H04L 9/0869 |
| 2019/0228144 A1* | 7/2019 | Kermes | H04L 63/0861 |
| 2022/0029962 A1* | 1/2022 | Teo | H04L 63/166 |
| 2022/0286450 A1* | 9/2022 | Kaditz | H04L 67/10 |

* cited by examiner

SYSTEMS AND METHODS FOR SECURING AUTHENTICATION PROCEDURES

BACKGROUND

To protect the security and privacy of user data online, users typically complete authentication procedures to access corresponding user accounts. Traditionally, users may enter a single static password to access a user account. Nevertheless, such static passwords have limitations and vulnerabilities from a security perspective. Accordingly, more modern systems may use a second factor authentication procedure to verify users prior to granting access to corresponding user accounts. Although such second factor authentication procedures may improve upon traditional authentication procedures, such as those that are based on single static passwords, current implementations of second factor authentication procedures may also prove to be suboptimal along one or more dimensions, as discussed further below. The present disclosure, therefore, identifies and addresses a need for improved systems and methods for securing authentication procedures.

SUMMARY

As will be described in greater detail below, the present disclosure describes various systems and methods for securing authentication procedures. In one example, a computer-implemented method for securing authentication procedures may include (i) monitoring, by a third-party security application, to detect reception of a second factor authentication token that may be input to complete a second factor authentication procedure in connection with a second application that is independent from the third-party security application, (ii) verifying, by the third-party security application, whether or not the second factor authentication token was transmitted by a valid server in coordination with the second application as part of an authentic version of the second factor authentication procedure, and (iii) performing a security action to protect a user account based on a result of verifying whether or not the second factor authentication token was transmitted by the valid server in coordination with the second application as part of the authentic version of the second factor authentication procedure.

In one embodiment, the second factor authentication token may include a verification code. In one embodiment, the second factor authentication token is transmitted as part of a payload of a short message service message. In some examples, monitoring to detect reception of the second factor authentication token may include leveraging a short message service read permission. In some examples, monitoring to detect reception of the second factor authentication token may include registering for a notification listener service.

In some examples, verifying whether or not the second factor authentication token was transmitted by the valid server in coordination with the second application as part of the authentic version of the second factor authentication procedure may include verifying that the second factor authentication token was transmitted within a second factor authentication message. In some examples, verifying whether or not the second factor authentication token was transmitted by the valid server in coordination with the second application as part of the authentic version of the second factor authentication procedure may include verifying whether or not the second factor authentication message is formatted according to a predefined format for the valid server. In some examples, verifying whether or not the second factor authentication token was transmitted by the valid server in coordination with the second application as part of the authentic version of the second factor authentication procedure may include checking a message that included the second factor authentication token against a short-code directory database.

In one embodiment, the short-code directory database lists at least two of the following items of information for each one of multiple short-code message sources: (i) organization name information, (ii) a package name of an associated mobile application that a corresponding company owns, (iii) at least one uniform resource locator used for a second factor authentication portal, and (iv) a template that has been previously used for verification codes. In some examples, performing the security action may include issuing a notification indicating that the second factor authentication token is trusted.

In one embodiment, a system for implementing the above-described method may include (i) a monitoring module, stored in memory, that monitors, as part of a third-party security application, to detect reception of a second factor authentication token that may be input to complete a second factor authentication procedure in connection with a second application that is independent from the third-party security application, (ii) a verification module, stored in memory, that verifies, as part of the third-party security application, whether or not the second factor authentication token was transmitted by a valid server in coordination with the second application as part of an authentic version of the second factor authentication procedure, (iii) a performance module, stored in memory, that performs a security action to protect a user account based on a result of verifying whether or not the second factor authentication token was transmitted by the valid server in coordination with the second application as part of the authentic version of the second factor authentication procedure, and (iv) at least one physical processor configured to execute the monitoring module, the verification module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) monitor, through a third-party security application, to detect reception of a second factor authentication token that may be input to complete a second factor authentication procedure in connection with a second application that is independent from the third-party security application, (ii) verify, through the third-party security application, whether or not the second factor authentication token was transmitted by a valid server in coordination with the second application as part of an authentic version of the second factor authentication procedure, and (iii) perform a security action to protect a user account based on a result of verifying whether or not the second factor authentication token was transmitted by the valid server in coordination with the second application as part of the authentic version of the second factor authentication procedure.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
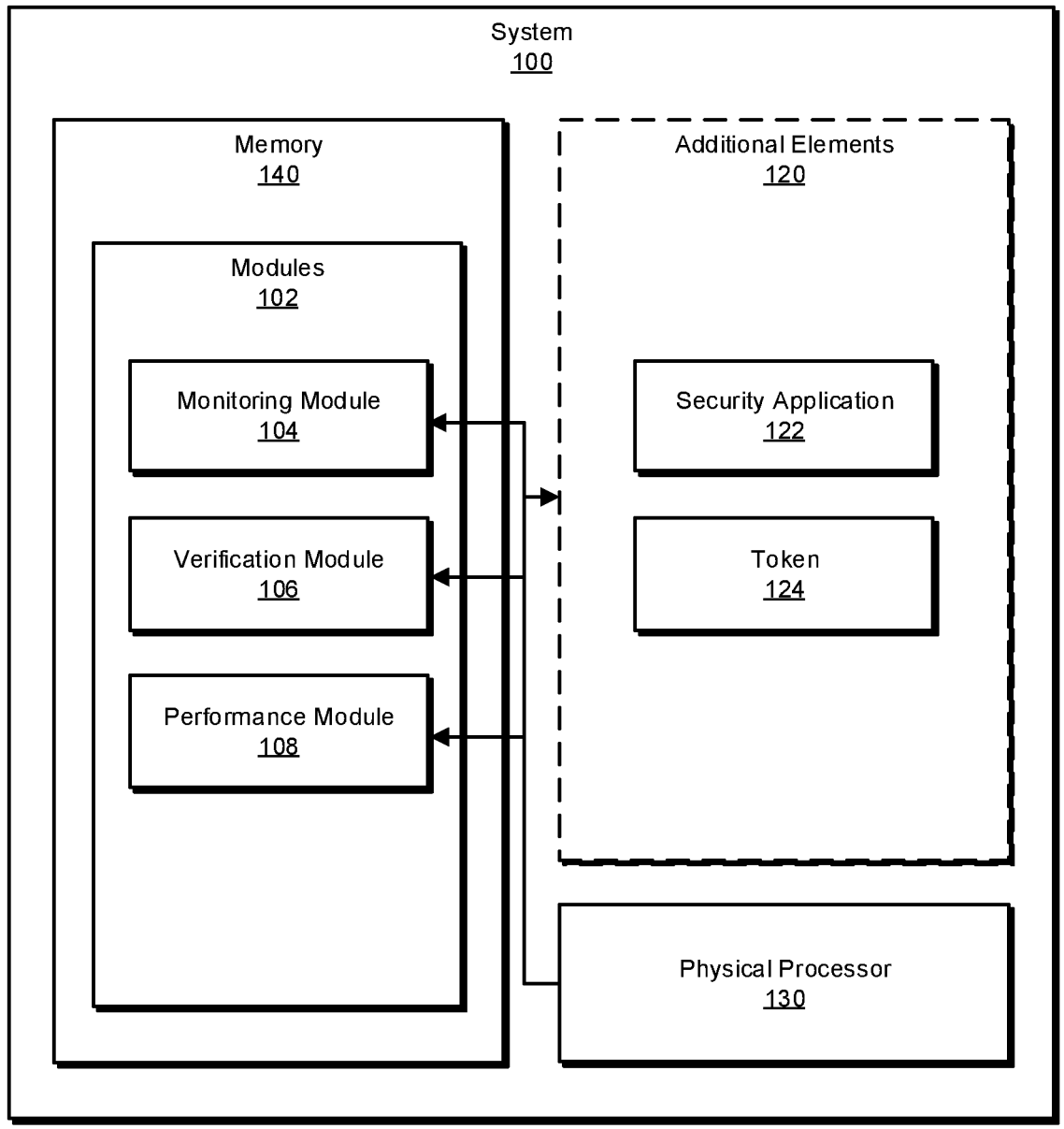
FIG. 1 is a block diagram of an example system for securing authentication procedures.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for securing authentication procedures. Although there are several types of second factor authentication mechanisms (which may also be called two-factor or multifactor authentication mechanisms), the most commonly used one, and the least secure one, corresponds to the short message service protocol (SMS). One source has mentioned that over 80% of all organizations reported that their users experienced some form of SMS-based phishing attack. Unfortunately, with all the known issues relating to SMS, this protocol is still used heavily by organizations as a second factor authentication mechanism to protect user accounts. To exacerbate this issue, users may not be educated on verification codes. The users may also be unaware of how sensitive the codes are. Organizations may try to educate users by stating in the SMS message to not share it. Nevertheless, there may be nothing in place to enforce this request. Also, users may only have the SMS short-code itself to help them verify whether the code is valid. It can be difficult to remember which organizations are using which short-codes.

To address these issues, this application discloses improved techniques for either or both (i) verifying that a received SMS short-code is authentic according to a trusted SMS short-code database such that the code can be relied upon as part of an authentic second factor authentication procedure and (ii) additionally and optionally enforcing that the user can only input verification codes coming from a verified source (which may be known by a corresponding SMS short-code) inside the corresponding intended application or browser uniform resource locator.

Figure 2:
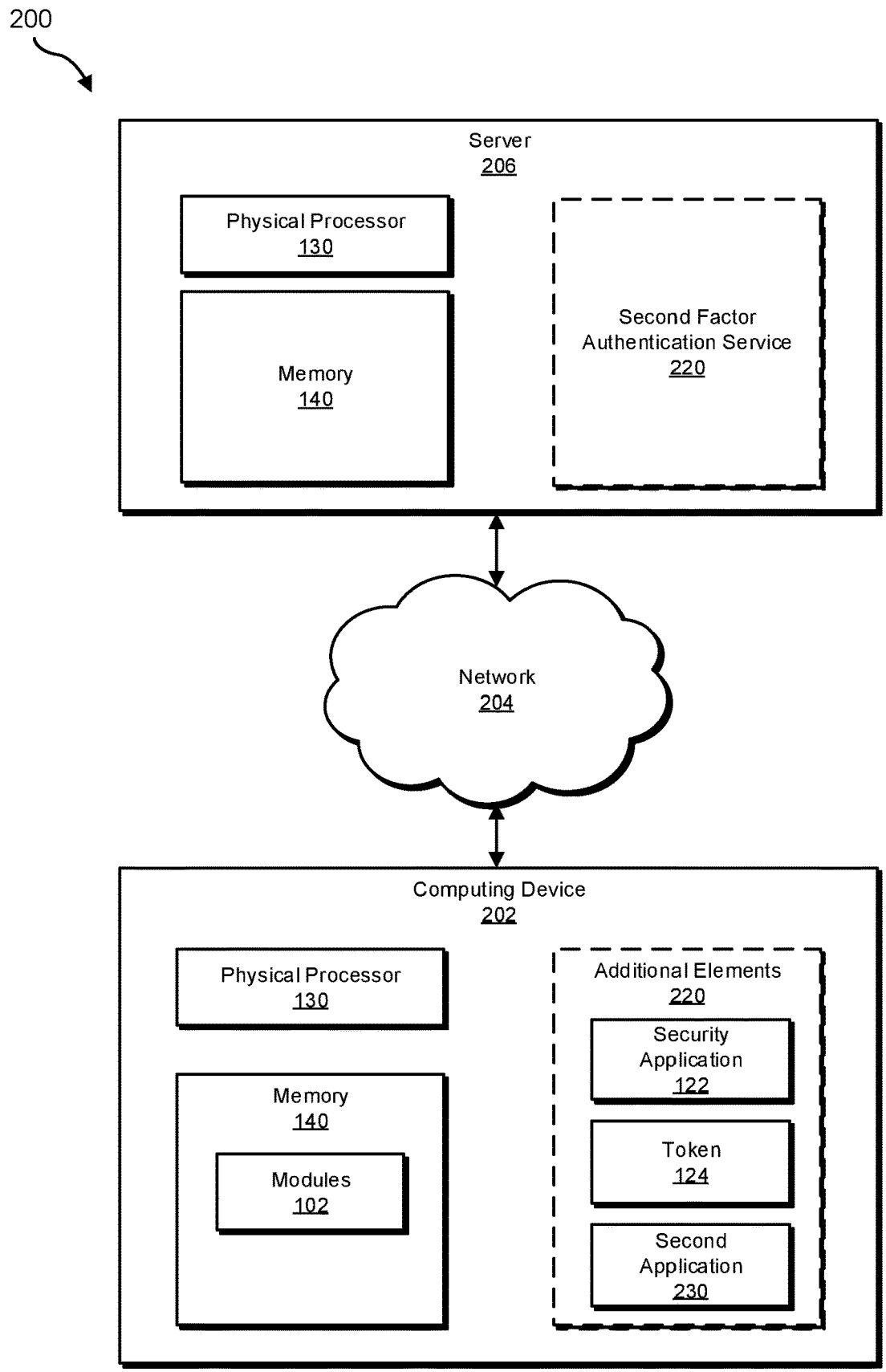
FIG. 2 is a block diagram of an additional example system for securing authentication procedures.

The following will provide, with reference to FIGS. 1-2, detailed descriptions of example systems for securing authentication procedures. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for securing authentication procedures. As illustrated in this figure, example system 100 may include one or more modules 102 for performing one or more tasks. For example, and as will be explained in greater detail below, example system 100 may include a monitoring module 104 that monitors, by a third-party security application, such as a security application 122, to detect reception of a candidate second factor authentication token, such as a token 124, that may be input to complete a second factor authentication procedure in connection with a second application that is independent from the third-party security application. Example system 100 may additionally include a verification module 106 that verifies, by the third-party security application, whether or not the second factor authentication token was transmitted by a valid server in coordination with the second application as part of an authentic version of the second factor authentication procedure. Example system 100 may also include a performance module 108 that performs a security action to protect a user account based on a result of verifying whether or not the second factor authentication token was transmitted by the valid server in coordination with the second application as part of the authentic version of the second factor authentication procedure. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate securing authentication procedures. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. For example, and as will be described in greater detail below, one or more of modules 102 may cause computing device 202 and/or server 206 to securing authentication procedures.

For example, and as will be described in greater detail below, monitoring module 104 may monitor, as part of security application 122, to detect reception of a candidate second factor authentication token, such as token 124, that may be input to complete a second factor authentication procedure in connection with a second application 230 that is independent from the third-party security application. Verification module 106 may verify, as part of security application 122, whether or not token 124 was transmitted by a valid server, such as a server 206, in coordination with second application 230 as part of an authentic version of the second factor authentication procedure. Performance module 108 may perform a security action to protect a user account based on a result of verifying whether or not token 124 was transmitted by server 206 in coordination with second application 230 as part of the authentic version of the second factor authentication procedure. This figure also illustrates how server 206 may optionally provide a second factor authentication service 220.

Computing device 202 generally represents any type or form of computing device capable of reading computer-executable instructions. Illustrative examples of computing device 202 may include end-user computing devices through which users may attempt to complete authentication procedures, as discussed further below. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300. An illustrative example of server 206 may include a service-providing server that transmits a second factor authentication token as part of a procedure for logging into the service, as discussed in more detail below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
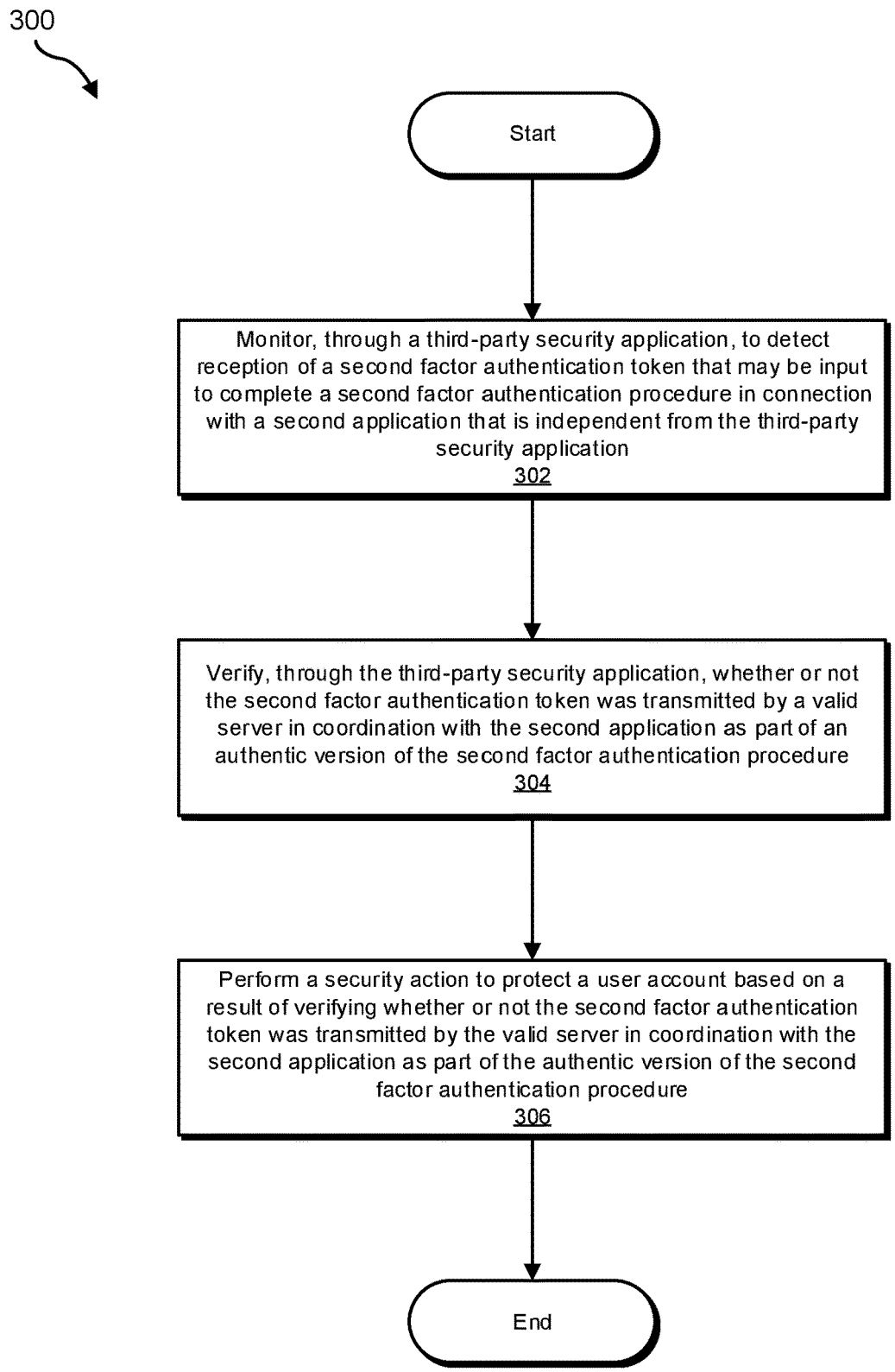
FIG. 3 is a flow diagram of an example method for securing authentication procedures.

FIG. 3 is a flow diagram of an example computer-implemented method 300 for securing authentication procedures. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may monitor, as part of a third-party security application, to detect reception of a second factor authentication token that may be input to complete a second factor authentication procedure in connection with a second application that is independent from the third-party security application. For example, monitoring module 104 may monitor, as part of security application 122, to detect reception of token 124 that may be input to complete a second factor authentication procedure in connection with second application 230 that is independent from security application 122.

As used herein, the term "independent" generally refers to the second application operating substantially independent of the third-party security application. For example, the second application may correspond to a general-purpose email service, such as GMAIL, and the third-party security application may correspond to a mobile device security suite, such as NORTON MOBILE. These two applications may have different owners and may be developed independently of each other, even if the security application provides functionality that helps ensure the integrity or safety of operating the other application.

Monitoring module 104 may perform step 302 in a variety of ways. In one embodiment, the second factor authentication token may include a verification code. As used herein, the term "verification code" may generally refer to a code that a server provides to a requesting device or user as part of a second factor authentication procedure such that the user may demonstrate, in a corresponding client device, that the user possesses the verification code. Additionally, or alternatively, the second factor authentication token may be transmitted as part of a payload of a short message service message. Of course, in other examples, the second factor authentication token may be transmitted as part of any other network message, pop-up, email, or notification, etc.

Figure 4:
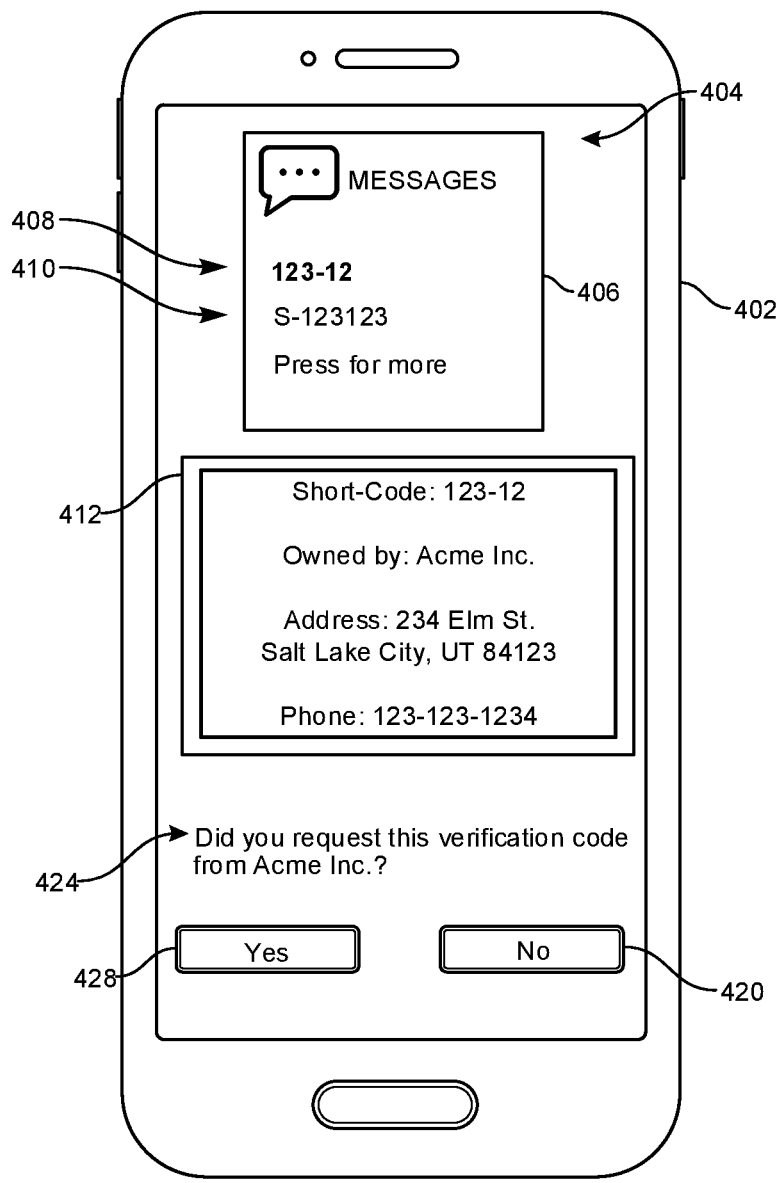
FIG. 4 is a diagram of a graphical user interface for securing authentication procedures.

FIG. 4 shows an illustrative diagram of a graphical user interface for a smartphone that has received a second factor authentication token, which may correspond to a verification code 410, and which was transmitted within an SMS message 406 displayed within an application 404. This figure further illustrates that, in addition to SMS message 406 sending the verification code, this message also indicates a source in the form of a short-code 408. As further discussed above, such short-codes may constitute five or six digit numbers from which organizations may transmit SMS messages to users. Nevertheless, these users may not always remember which short-codes belong to which organizations, or which short-codes are trustworthy or not. Thus, users receiving such verification codes from sources indicated by short-codes may not be able to readily ascertain whether the verification codes are authentic parts of a valid second factor authentication procedure or, instead, part of a cyber-attack or phishing attack. Moreover, as further discussed above, users may not always be fully educated regarding the risks that such SMS messages may pose.

In some examples, monitoring module 104 may monitor to detect reception of the second factor authentication token by leveraging a short message service read permission. In some examples, monitoring module 104 may monitor to detect reception of the second factor authentication token by registering for a notification listener service. In some examples, either or both of these implementation features (e.g., leveraging the short message service read permission and/or registering for the notification listener service) may apply within a mobile device operating system environment, such as the ANDROID operating system environment. Generally speaking, embodiments of the disclosed subject matter may monitor incoming SMS messages using one or more SMS observer application programming interfaces for a mobile device operating system environment, such as the ANDROID operating system environment.

At step 304, one or more of the systems described herein may verify, as part of the third-party security application, whether or not the second factor authentication token was transmitted by a valid server in coordination with the second application as part of an authentic version of the second factor authentication procedure. For example, verification module 106 may verify, as part of security application 122, whether or not token 124 was transmitted by server 206 in coordination with the second application as part of an authentic version of the second factor authentication procedure.

Verification module 106 may perform step 304 in a variety of ways. Generally speaking, verification module 106 may perform step 304 by performing one or more of a series of substeps. For example, as a first substep, verification module 106 may verify whether or not the second factor authentication token was transmitted by the valid server by verifying that the second factor authentication token was transmitted within a second factor authentication message. In other words, verification module 106 may optionally begin by checking whether the message that carried the verification constitutes a second factor authentication message as distinct from any other generic kind of message. Additionally, verification module 106 may also optionally verify whether or not the second factor authentication token was transmitted by the valid server by verifying whether or not the second factor authentication message is formatted according to a predefined format for the valid server.

To perform the substep, verification module 106 may optionally perform one or more of the following: (i) looking up an identity or name, such as an organization name, that owns or corresponds to the short-code indicated by the message, and/or (ii) checking whether the verification code itself satisfies a predetermined or previously-known format or configuration that this particular source uses to format verification codes for second factor authentication purposes. As one illustrative example, an organization may use the short-code 123-123 and the organization may also configure its corresponding verification messages with the format X-######, where the "#" signs indicate arbitrary numbers that are specific to each respective verification code, and these numbers are always preceded by the character "X." Thus, verification module 106 may readily ascertain whether a received message includes these two items of information (e.g., the short-code and the verification code) and further ascertain whether these two items of information match (e.g., match the verification code template) according to information previously recorded and indexed for that particular short-code and corresponding organization.

In further examples, verification module 106 may verify whether or not the second factor authentication token was transmitted by the valid server by checking a message that included the second factor authentication token against a short-code directory database. Generally speaking, verification module 106 may perform step 304 at least in part by referencing a short-code directory database. The short-code directory database may index a multitude of previously encountered short-codes with respective items of information or metadata that correspond to each respective short-code. For example, for each respective short-code, the short-code directory database may identify any one or more of the following matching or previously-detected items of information (i) organization name information, (ii) a package name of an associated mobile application that a corresponding company owns, (iii) at least one uniform resource locator used for a second factor authentication portal, and/or (iv) a template that has been previously used for verification codes. In some examples, the short-code directory database may record two or more of these items of information for a set of such previously encountered short-codes, including potentially a multitude of such short-codes.

At step 306, one or more of the systems described herein may perform a security action to protect a user account based on a result of verifying whether or not the second factor authentication token was transmitted by the valid server in coordination with the second application as part of the authentic version of the second factor authentication procedure. For example, performance module 108 may, as part of computing device 202 in FIG. 2, perform a security action to protect a user account based on a result of verifying whether or not token 124 was transmitted by server 206 in coordination with second application 230 as part of the authentic version of the second factor authentication procedure. As used herein, the term "authentic version" is merely intended to distinguish between (i) normal or conventional second factor authentication procedures that operate as designed to protect a user's data and privacy and (ii) phishing attacks or other cyber attacks in which the second factor authentication procedure has been compromised in some manner such that a threat actor obtains access to the verification code and/or user data, etc. The term "valid server" is also merely intended to distinguish between such normal and safe operations of the second factor authentication procedure and compromised versions of such procedures.

By way of background, threat actors may operate SMS phishing attacks in at least two different common ways. In a first scenario, the threat actor operates a phishing site that acts as a middleman between the target's computing device and the intended destination service, such as an email server. Thus, the phishing site may intercept login credentials to the intended destination service and then relay those login credentials to the intended destination service. The intended destination service may trigger the transmission of a second factor authentication verification code to the target's computing device, which the phishing site may also intercept from the target's computing device. The phishing site may then relay the verification code to the intended destination service, thereby obtaining access to the private user data that is stored there.

A second scenario may operate in a manner that is similar to the first scenario, except that the threat actor does not operate a phishing site that intercepts both the login credentials and verification code while posing as the intended destination site. Instead, the threat actor may have previously obtained the login credentials (using any one or more of a variety of different techniques) and then may use those credentials to directly login to the intended destination site. This login attempt triggers the transmission of the second factor authentication verification code to the client's computing device. Since the threat actor is not intercepting everything that the client device transmits, the threat actor will not automatically receive the verification code. Accordingly, the attacker may use one or more forms of social engineering to manipulate the target into intentionally or deliberately transmitting the verification code to the threat actor (e.g., based on fraud or deception). Upon receiving the verification code, the threat actor may use the verification code to complete the second factor authentication procedure at the intended destination site.

Notably, in both of the above examples, the second factor authentication procedure is operating in a mostly correct manner from the limited perspective of the destination site that is transmitting the verification code. In other words, both of these examples do not involve a threat actor generating or transmitting a fake, dummy, or decoy verification code. Similarly, in both of these examples, the user is receiving the verification code from the valid server. Thus, the technology of this application is generally directed to detecting whether a valid verification code has been transmitted from a valid server in a manner where the verification code has been intercepted, exposed, or compromised, or instead whether the verification code has been transmitted in a trustworthy manner that protects the integrity of the second factor authentication procedure.

Performance module 108 may perform step 306 in a variety of ways. In some examples, performance module 108 may perform the security action by issuing a notification indicating that the second factor authentication token is trusted. Returning to FIG. 4, performance module 108 may issue a notification 412. Notification 412 may effectively retrieve a set of items of information matching short-code 408. In the illustrative example of this figure, the notification 412 may optionally display or output one or more of the short-code itself, an identifier or name for the organization matching or owning the short-code, the address for this organization, and/or a telephone number for this organization. Moreover, as further discussed above, these items of information may be obtained from a short-code directory database, which may further identify one or more of a package name of an associated mobile application that this organization or company owns, a uniform resource locator used as part of the second factor authentication portal for this company and/or for a service provided by this company, and/or a template that is used for short-codes from this particular organization. Any one or more of these items of information may also optionally be displayed to the user as part of notification 412.

Additionally, and optionally, verification module 106 may also look up a reputation of the organization corresponding to the short-code. Thus, an organization that has been previously detected as associated with phishing attacks may result in retrieving a negative or malicious reputation, which may be reported to the user. Similarly, an organization that has been previously detected as associated with genuine and authentic second factor authentication procedures may result in retrieving a positive or trustworthy reputation, which may also be reported to the user in that case. Generally speaking, performance module 108 may base the selection and/or performance of the security action on a result of checking the reputation of the short-code and corresponding organization.

More generally, performance module 108 may perform any suitable security action that may help to protect the user account based on a result of the performance of step 104. As another illustrative example, the security action may include prompting the user to input one or more items of information that help verification module 106 to verify whether the original message and/or verification code are part of a legitimate second factor authentication procedure or, instead, whether the procedure has been compromised, as discussed above. In the illustrative example of FIG. 4, a prompt 424 may prompt the user to indicate whether the user actually requested the transmission of the verification code. The user may optionally toggle a yes button 428 or a no button 420. In the case where the user toggles the yes button, the user may thereby increase the likelihood that the second factor authentication procedure is safe and not compromised. In contrast, if the user has not actually requested the verification code, then this may increase the likelihood that the second factor authentication procedure has been compromised and, instead, a threat actor has initiated the request for the verification code (e.g., with the hope of using social engineering to manipulate the target user to forward the verification code to the threat actor, as further discussed above). Performance module 108 may thereby use the input in connection with the yes button or the no button as at least one factor in deciding whether or not to approve the second factor authentication procedure or otherwise perform a security action to protect the user.

Additionally, and optionally, illustrative examples of the security action may include any one or more of the following: blocking, inhibiting, or resisting an attempt by the user to complete the second factor authentication procedure based on an indication that the second factor authentication procedure is compromised, updating a reputation for the short-code or corresponding organization based on a result of the performance of step 304, automatically populating and/or navigating the user to a verified portal that matches a verified or legitimate organization that transmitted the verification code thereby preventing the user from entering information into a phishing or compromised portal, issuing a prompt to the user to help the user identify and resist attempts at social engineering based on an indication that the second factor authentication procedure is compromised, and/or automatically completed the second factor authentication procedure based on an indication that the procedure is safe or that no indication of compromise has been detected.

As another example of the security action, performance module 108 may enforce that the verification code can only be input by the user into a legitimate matching application or browser uniform resource locator (e.g., in the case that there is no indication that the second factor authentication procedure has been compromised). In some examples, performance module 108 may perform this enforcement by leveraging an accessibility service of an operating system environment such as the ANDROID operating system environment. Performance module 108 may leverage the accessibility service functionality within the operating system environment to determine which application the user is interacting with (e.g., a browser or online banking application). Performance module 108 may also optionally block user input by intercepting an accessibility event and preventing this event from being relayed to a specific application. In other words, performance module 108 may leverage the accessibility service provided by the operating system environment to identify the target application or uniform resource locator that the user may be attempting to send one or more items of information to, check whether the target is actually legitimate, and prevent the user from entering information into any target application or location that is not actually legitimate and matching the short-code, as discussed above. Because in some examples verification codes may expire after a few minutes, this enforcement procedure would therefore only need to occur for a short period of time.

Additionally, or alternatively, another implementation of the enforcement procedure may be implemented through a clipboard listener (e.g., in a scenario where the user is trying to copy or paste a verification code). This implementation can be achieved using a clipboard listener that is provided by an operating system environment, such as the ANDROID operating system environment (e.g., "ClipboardManager"). In these examples, performance module 108 may monitor the clipboard within the operating system for the verification code and, upon detection, performance module 108 may block the user from pasting this code into an incorrect target application or location.

The above description provides a general overview of various embodiments for the performance of method 300 of FIG. 3. Additionally, or alternatively, the following description provides concrete examples of more detailed embodiments of the disclosed subject matter here.

This application generally discloses technology that may enforce a user to only input verification codes, which are coming from a verified source (as indicated by an SMS short-code) into the intended or appropriate application or browser uniform resource locator, such that the overall second factor authentication procedure remains safe and effective as distinct from inputting the verification code into an unintended or undesirable location, such as a phishing website. Additionally, this application discloses technology that may verify the authenticity of an SMS short-code and/or corresponding verification code by maintaining a trusted SMS short-code database, as further discussed above.

At a high level, the application may disclose the monitoring of a device for any incoming SMS messages that are related to second factor authentication procedures. The disclosed subject matter may perform a verification of the SMS message (or other network message) to ensure that this message is authentic and coming from a valid source (or that the message is transmitted in a manner that is safe without being intercepted or compromised). The disclosed subject matter may then notify the user that the verification code is good or safe. The disclosed subject matter may also provide the user with information about the verification code and/or short-code, and this information may include an identification of which organization sent the verification code. Lastly, the disclosed subject matter may optionally enforce that this verification code can only be applied to approved applications or approved uniform resource locators.

At a first step, the disclosed subject matter may verify all incoming SMS messages related to second factor authentication. This verification procedure may be performed using at least one or both of two implementations. According to one implementation, the disclosed subject matter may use a SMS read permission within an operating system environment. Additionally, or alternatively, the disclosed subject matter may read incoming SMS messages by registering for a notification listener service. In this latter example, the disclosed subject matter may read the SMS messages from the notification bar. Both of these examples may apply within a mobile operating system environment such as ANDROID.

After retrieving or reading the SMS message, the disclosed subject matter may analyze the message to ensure that it is a second factor authentication message that contains a verification code. Organizations typically use the same format for all of their second factor authentication messages, and this fact may render the verification process relatively easy. For example, the particular organization's second factor authentication messages may come from the same short-code (e.g, 12345) and contain the text in the format "X-###### is your [organization name] verification code." Verification codes may typically be six digits or eight digits, which may further increase the ease of performing the analysis step here.

After ensuring that the received message is a second factor authentication message containing the verification code, the disclosed subject matter may optionally look the corresponding short-code up within a SMS short-code database to determine which organization is the source and whether the corresponding message is transmitted in a safe manner. The database may optionally be similar to a public short-code directory, such as usshortcodedirectory.com, although the directory here may add additional or embellishing information, such as: organization name information, a package name for an associated mobile application that the company owns, one or more uniform resource locators used for the corresponding second factor authentication portal, and/or a template that is used by the organization for verification codes.

At a second step, the disclosed subject matter may notify the user that the verification code is authentic or inauthentic (i.e., transmitted as part of a second factor authentication procedure that has not been compromised or that has been compromised). After verifying whether the SMS message is good, the disclosed subject matter can notify the user via a notification or modal dialog that the messages safe or not. The disclosed subject matter may also provide the user information about the message such as who owns the corresponding short-code and/or company information. By providing the user this information, the user can be sure that the message was expected. For example, if the user is informed that a message came from a specific online bank, then the user can check that the user expected a message from this particular bank. Also, if a user is going to input the verification code on a separate device or on a personal computer, then providing the user this information would also be helpful to them in that scenario. As an optional third step, the disclosed subject matter may enforce that the verification code can only be input into the intended or approved application or browser uniform resource locator, as further discussed above.

Figure 5:
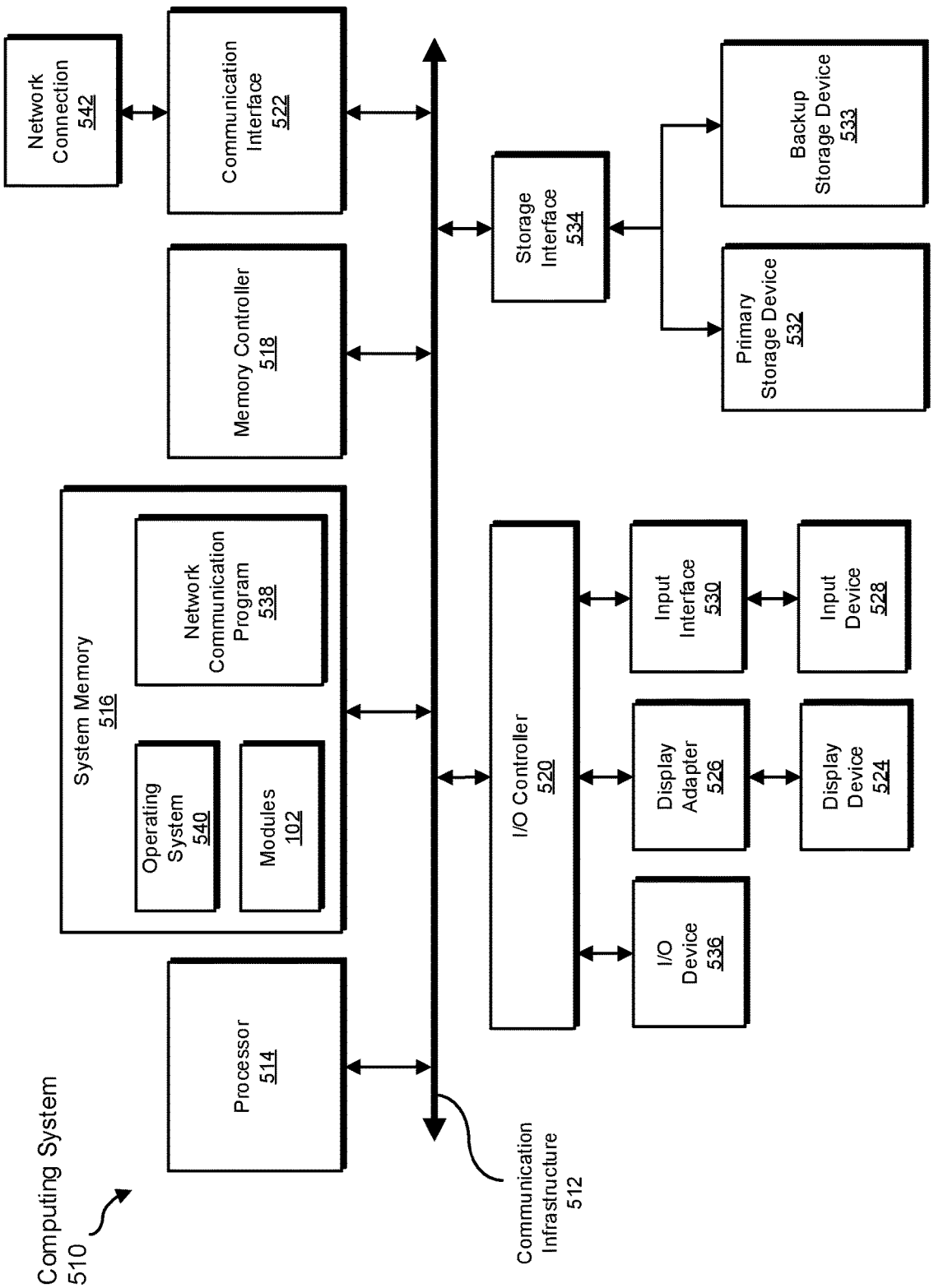
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
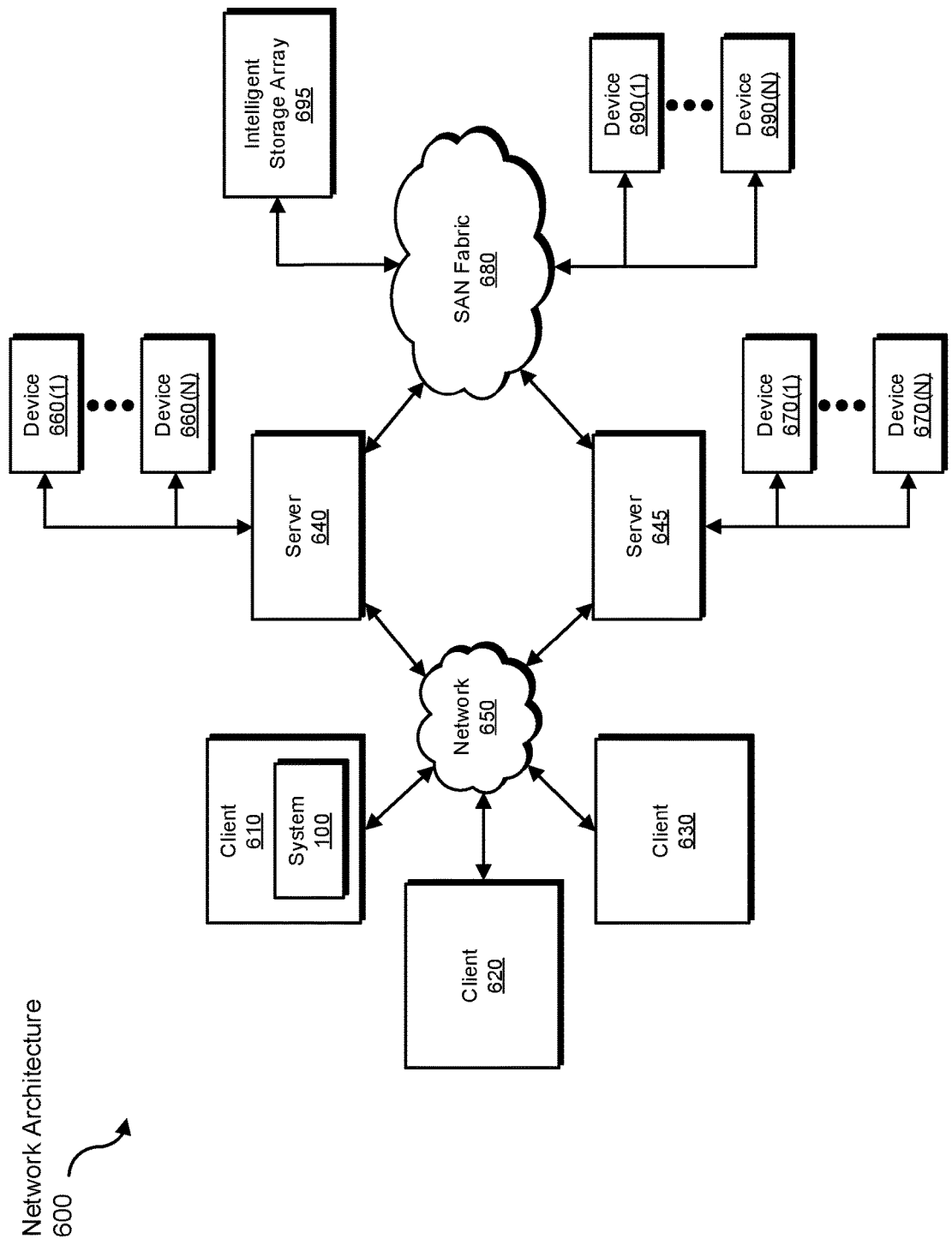
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for securing authentication procedures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for securing authentication procedures, at least a portion of the method being performed by a computing device comprising at least one processor, the method comprising:

monitoring, by a third-party security application, to detect reception of a second factor authentication token as an input to complete a second factor authentication procedure in connection with a second application that is independent from the third-party security application;

verifying, by the third-party security application, whether or not the second factor authentication token was transmitted by a valid server in coordination with the second application as part of an authentic version of the second factor authentication procedure; and performing a security action to protect a user account based on a result of verifying whether or not the second factor authentication token was transmitted by the valid server in coordination with the second application as part of the authentic version of the second factor authentication procedure, wherein, upon verifying that the second factor authentication token was not transmitted by the valid server, performing the security action comprises:

accessing an accessibility service provided by an operating system environment on the computing device to identify the second application; and blocking a user input from being received by the second application by intercepting an accessibility event and preventing the accessibility event from being relayed to the second application.

2. The computer-implemented method of claim 1, wherein the second factor authentication token comprises a verification code.

3. The computer-implemented method of claim 1, wherein the second factor authentication token is transmitted as part of a payload of a short message service message.

4. The computer-implemented method of claim 1, wherein monitoring to detect reception of the second factor authentication token comprises leveraging a short message service read permission.

5. The computer-implemented method of claim 1, wherein monitoring to detect reception of the second factor authentication token comprises registering for a notification listener service.

6. The computer-implemented method of claim 1, wherein verifying whether or not the second factor authentication token was transmitted by the valid server in coordination with the second application as part of the authentic version of the second factor authentication procedure comprises verifying that the second factor authentication token was transmitted within a second factor authentication message.

7. The computer-implemented method of claim 6, wherein verifying whether or not the second factor authentication token was transmitted by the valid server in coordination with the second application as part of the authentic version of the second factor authentication procedure comprises verifying whether or not the second factor authentication message is formatted according to a predefined format for the valid server.

8. The computer-implemented method of claim 1, wherein verifying whether or not the second factor authentication token was transmitted by the valid server in coordination with the second application as part of the authentic version of the second factor authentication procedure comprises checking a message that included the second factor authentication token against a short-code directory database.

9. The computer-implemented method of claim 8, wherein the short-code directory database lists at least two of the following items of information for each one of multiple short-code message sources:
- organization name information;
- a package name of an associated mobile application that a corresponding company owns;
- at least one uniform resource locator used for a second factor authentication portal; and
- a template that has been previously used for verification codes.

10. The computer-implemented method of claim 1, wherein performing the security action comprises issuing a notification indicating that the second factor authentication token is trusted.

11. A system for securing authentication procedures, the system comprising:
- a monitoring module, stored in memory, that monitors, as part of a third-party security application, to detect reception of a second factor authentication token as an input to complete a second factor authentication procedure in connection with a second application that is independent from the third-party security application;
- a verification module, stored in memory, that verifies, as part of the third-party security application, whether or not the second factor authentication token was transmitted by a valid server in coordination with the second application as part of an authentic version of the second factor authentication procedure;
- a performance module, stored in memory, that performs a security action to protect a user account based on a result of verifying whether or not the second factor authentication token was transmitted by the valid server in coordination with the second application as part of the authentic version of the second factor authentication procedure, wherein, upon verifying that the second factor authentication token was not transmitted by the valid server, the security action comprises:
  - accessing an accessibility service provided by an operating system environment on a computing device to identify the second application; and
  - blocking a user input from being received by the second application by intercepting an accessibility event and preventing the accessibility event from being relayed to the second application; and
- at least one physical processor, on the computing device, configured to execute the monitoring module, the verification module, and the performance module.

12. The system of claim 11, wherein the second factor authentication token comprises a verification code.

13. The system of claim 11, wherein the second factor authentication token is transmitted as part of a payload of a short message service message.

14. The system of claim 11, wherein the monitoring module monitors to detect reception of the second factor authentication token by leveraging a short message service read permission.

15. The system of claim 11, wherein the monitoring module monitors to detect reception of the second factor authentication token by registering for a notification listener service.

16. The system of claim 11, wherein the verification module verifies whether or not the second factor authentication token was transmitted by the valid server in coordination with the second application as part of the authentic version of the second factor authentication procedure by verifying that the second factor authentication token was transmitted within a second factor authentication message.

17. The system of claim 16, wherein the verification module verifies whether or not the second factor authentication token was transmitted by the valid server in coordination with the second application as part of the authentic version of the second factor authentication procedure by verifying whether or not the second factor authentication message is formatted according to a predefined format for the valid server.

18. The system of claim 11, wherein the verification module verifies whether or not the second factor authentication token was transmitted by the valid server in coordination with the second application as part of the authentic version of the second factor authentication procedure by checking a message that included the second factor authentication token against a short-code directory database.

19. The system of claim 18, wherein the short-code directory database lists at least two of the following items of information for each one of multiple short-code message sources:
- organization name information;
- a package name of an associated mobile application that a corresponding company owns;
- at least one uniform resource locator used for a second factor authentication portal; and
- a template that has been previously used for verification codes.

20. A non-transitory computer-readable medium comprising one or more computer-readable instructions that, when executed by at least one processor of a computing device, cause the computing device to:
- monitor, through a third-party security application, to detect reception of a second factor authentication token as an input to complete a second factor authentication procedure in connection with a second application that is independent from the third-party security application;

verify, through the third-party security application, whether or not the second factor authentication token was transmitted by a valid server in coordination with the second application as part of an authentic version of the second factor authentication procedure; and perform a security action to protect a user account based on a result of verifying whether or not the second factor authentication token was transmitted by the valid server in coordination with the second application as part of the authentic version of the second factor authentication procedure, wherein, upon verifying that the second factor authentication token was not transmitted by the valid server, the security action comprises:

accessing an accessibility service provided by an operating system environment on the computing device to identify the second application; and blocking a user input from being received by the second application by intercepting an accessibility event and preventing the accessibility event from being relayed to the second application.

* * * * *